United States Patent [19]

Mariner et al.

[11] Patent Number: 5,863,467
[45] Date of Patent: Jan. 26, 1999

[54] HIGH THERMAL CONDUCTIVITY COMPOSITE AND METHOD

[75] Inventors: John Thomas Mariner, Avon Lake; Haluk Sayir, Bay Village, both of Ohio

[73] Assignee: Advanced Ceramics Corporation, Lakewood, Ohio

[21] Appl. No.: 642,469

[22] Filed: May 3, 1996

[51] Int. Cl.$^6$ ............................... H01B 1/24; C08K 3/04
[52] U.S. Cl. ........................... 252/511; 524/496; 264/105
[58] Field of Search ............................. 252/511; 423/448; 428/305.5, 332; 524/496; 264/105, 241

[56] References Cited

U.S. PATENT DOCUMENTS

| | | | |
|---|---|---|---|
| 4,087,343 | 5/1978 | Custer et al. | 204/219 |
| 4,623,586 | 11/1986 | Umeya et al. | 428/324 |
| 4,704,231 | 11/1987 | Chung | 252/511 |
| 4,891,203 | 1/1990 | Singer et al. | 423/449 |
| 5,186,919 | 2/1993 | Bunnell | 423/448 |
| 5,296,310 | 3/1994 | Kibler et al. | 428/614 |
| 5,316,080 | 5/1994 | Banks et al. | 165/185 |
| 5,391,433 | 2/1995 | Kawakubo et al. | 428/408 |
| 5,404,837 | 4/1995 | Yoshimoto et al. | 117/88 |
| 5,432,379 | 7/1995 | Eguchi et al. | 257/627 |
| 5,449,507 | 9/1995 | Murakami et al. | 423/448 |

FOREIGN PATENT DOCUMENTS

| | | |
|---|---|---|
| 23 32 264 | 1/1975 | Germany . |
| 02283522 | 2/1992 | Japan . |

OTHER PUBLICATIONS

Thermal Diffusivity and Thermal Conductivity of Pyrolytic Graphite from 300 to 2700 Degrees K—M.R. Null, W.W. Lozier and A.W. Moore Carbon 1973, vol. 11, pp. 81–87—Union Carbide Corp. (No Month).

Thermophysical Properties of PG and Polymer Filled with PG—A Report to Advanced Ceramics Corp. by R.E. Taylor, H. Groot and J. Ferrier—Sep. 1995—Thermophysical Properties Research Laboratory.

Electrical and Thermal Conductivities of Polyethylene Composites Filled with Biaxial Oriented Short–Cut Carbon Fibers, Journal of Applied Polymer Science,52(1994)May 31, No. 9, New York, US.

*Primary Examiner*—Mark Kopec
*Attorney, Agent, or Firm*—Eugene Lieberstein; Michael N. Meller

[57] ABSTRACT

This invention is directed to a composite composition of particles of highly oriented graphite in the form of flakes having a hexagonal crystal orientation and an aspect ratio of at least 5 to 1 and a polymeric binder which when polymerized under compression forms a solid having a high thermal conductivity and low density and to a method of forming a machinable composite of high thermal conductivity comprising the steps of combining particles of highly oriented graphite flakes having an hexagonal crystal orientation and an aspect ratio of at least 5 to 1 with a polymeric binder to form a composition having at least a 40% graphite particle volume fraction, compressing the composition under a pressure sufficient to substantially align the particles parallel to one another and to the surface of the composition normal to the direction of the applied pressure until said binder polymerizes into a solid thereby forming an electrically conductive solid having a high thermal conductivity.

5 Claims, 4 Drawing Sheets

HIGH THERMAL CONDUCTIVITY COMPOSITE AND METHOD

FIELD OF THE INVENTION

This invention relates to a thermally and electrically conductive composite of thermally treated pyrolytic graphite and/or natural graphite in a polymeric binder which when polymerized under compression forms a solid having high thermal conductivity and low density and to the method for forming a high thermally conductive solid from compressed thermally treated pyrolytic graphite or natural graphite in a polymeric binder.

BACKGROUND OF THE INVENTION

It is well known that high power electronic assemblies and components are generally provided with an aluminum or copper heat sink for dissipation of waste heat. Similarly, individual integrated circuits are also mounted on aluminum or copper for heat transfer and heat spreading to alleviate hot spots. As electronic device densities continue to increase, more components are packed into smaller areas and management of the waste heat becomes increasingly more important. High temperature can seriously degrade the life of the electronics.

Hitherto, aluminum or copper has been the material of choice for dissipating and spreading heat. Copper has a thermal conductivity of 380 watts/meter-K which is higher than that of aluminum with a thermal conductivity of 180 watts/meter-K but the density of copper (8.9 gm/cm$^3$) is over three times that of aluminum (2.7 gm/cm$^3$). In fact the ratio of thermal conductivity to unit density for copper is 44 as compared to a thermal conductivity ratio for aluminum of 64. Hence, in an application where weight is an important factor aluminum is preferred for use in dissipating heat over that of copper. As electronic items shrink in size, power densities and waste heat become increasing problems and the geometry of the aluminum or copper heat dissipator becomes a limiting factor. For effective heat transfer with aluminum the dissipator will need to be very large whereas for effective heat transfer with copper both weight and geometry considerations prevail. The geometry of the heat dissipator must fit into the space left after the packing of the device is optimized. This necessitates using a dissipator of a versatile formable shape. Materials which have been developed to date as heat dissipating substitutes for copper or aluminum all suffer from low thermal conductivity, high density or rigid geometric design criteria.

SUMMARY OF THE INVENTION

The material of the present invention is readily formed into any desired shape and broadly comprises a composite of thermally treated graphite or natural graphite comprising particles of graphite in the form of flakes having a hexagonal crystal orientation and an aspect ratio of at least 5 to 1 in a polymeric binder which when polymerized under compression forms a solid having a high thermal conductivity and low density.

The present invention also comprises a solid composite material consisting essentially of thermally treated graphite particles in the form of flakes having a hexagonal crystal orientation and an aspect ratio of at least 5 to 1 maintained under compression within a polymeric binder with the particles in substantial parallel alignment and with the composite having a thermal conductivity of greater than 100 watts/meter-K and a ratio of thermal conductivity to unit density of at least 50 and up to 200.

The method of the present invention comprises combining particles of thermally treated graphite flakes or natural graphite flakes having an hexagonal crystal orientation and an aspect ratio of at least 5 to 1 with a polymeric binder to form a composition having at least a 40% graphite particle volume fraction, compressing the composition under a pressure sufficient to substantially align the particles parallel to one another and to the surface of the composition normal to the direction of the applied pressure until said polymeric binder polymerizes into a solid whereby an electrically conductive solid is formed having a thermal conductivity of greater than 100 watts/meter-K.

BRIEF DESCRIPTION OF THE DRAWINGS

The advantages of the present invention will become apparent from the following detailed description of the present invention when read in conjunction with the accompanying drawings of which.

DETAILED DESCRIPTION OF THE INVENTION

Graphite is made up of layer planes of hexagonal arrays or networks of carbon atoms. These layer planes of hexagonal arranged carbon atoms are substantially flat and are oriented so as to be substantially parallel and equidistant to one another. The substantially flat parallel layers of carbon atoms are referred to as basal planes and are linked or bonded together in groups arranged in crystallites. Conventional or electrolytic graphite has a random order to the crystallites. Highly ordered graphite has a high degree of preferred crystallite orientation. Accordingly, graphite may be characterized as laminated structures of carbon having two principal axes, to wit, the "c" axes which is generally identified as the axes or direction perpendicular to the carbon layers and the "a" axes or direction parallel to the carbon layers and transverse to the c axes. Graphite materials which exhibit a high degree of orientation include natural graphite and synthetic or pyrolytic graphite. Natural graphite is commercially available in the form of flakes (platellets) or as a powder. Pyrolytic graphite is produced by the pyrolysis of a carbonaceous gas on a suitable substrate at elevated temperature. Briefly, the pyrolytic deposition process may be carried out in a heated furnace heated to above 1500° C. and up to 2500° C. and at a suitable pressure, wherein a hydrocarbon gas such as methane, natural gas, acetylene etc. is introduced into the heated furnace and is thermally decomposed at the surface of a substrate of suitable composition such as graphite having any desirable shape. The substrate may be removed or separated from the pyrolytic graphite. The pyrolytic graphite may then be further subjected to thermal annealing at high temperatures to form a highly oriented pyrolytic graphite commonly referred to as "HOPG" or "TPG" material. The HOPG or TPG material can be comminuted into a flake like form having a high "aspect ratio" or pulverized into a powder.

Figure 2A:
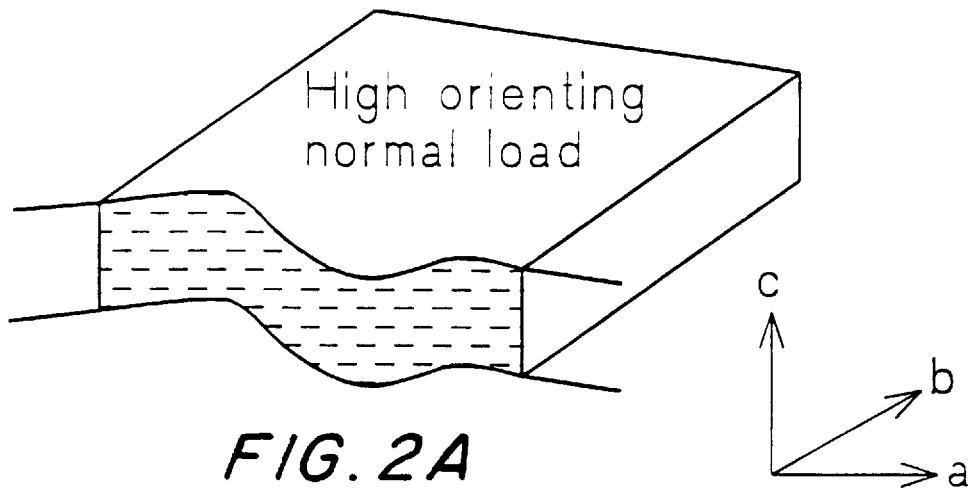
FIGS. 2a, 2b and 2c are representative sketches of a cross section of the polymerized composite of the present invention under different loading conditions.
Figure 2B:
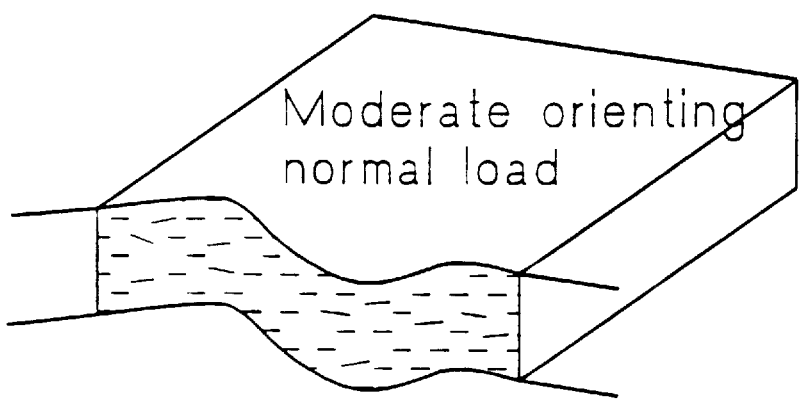
Figure 2C:
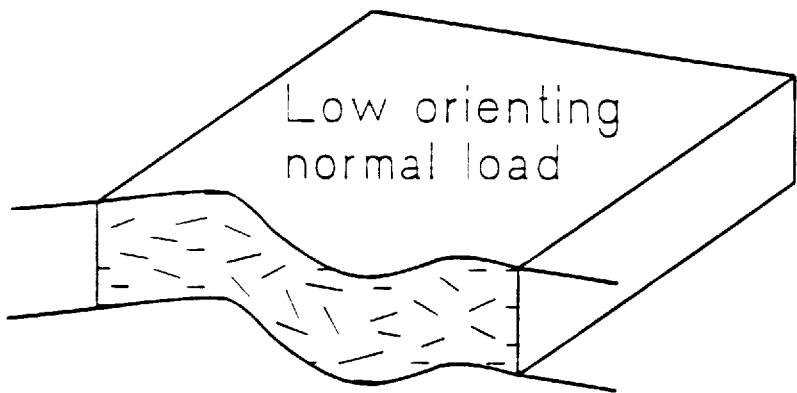

In accordance with the present invention any graphite material is suitable having a high anistrophy such that its thermal conductivity is much higher parallel to the flake surface than throughout its thickness. This includes both natural graphite and thermally annealed pyrolytic graphite inclusive of highly oriented pyrolytic graphite and oriented graphite produced from the pyrolysis of laminated polymeric sheets. It is however critical to the present invention that the selected natural or thermally annealed graphite have a flake like geometry and an "aspect ratio" of at least 5:1. The aspect ratio of the flake refers to its planar dimension relative to its thickness. Stated otherwise, the flake has very little thickness and can, as such, be visualized as a plate like object which is wafer thin having an aspect ratio between its longest planar dimension and its thickness of at least 5:1 and preferably at least 10:1. The planar size of the flake like particles are also important to the present invention in that larger size flakes enhance thermal conductivity. Accordingly the planar dimensions of the flakes e.g. length and width should be as large as practical for reasons which will become clearer in connection with the discussion of FIG. 2a to FIG. 2c respectively.

Figure 1:
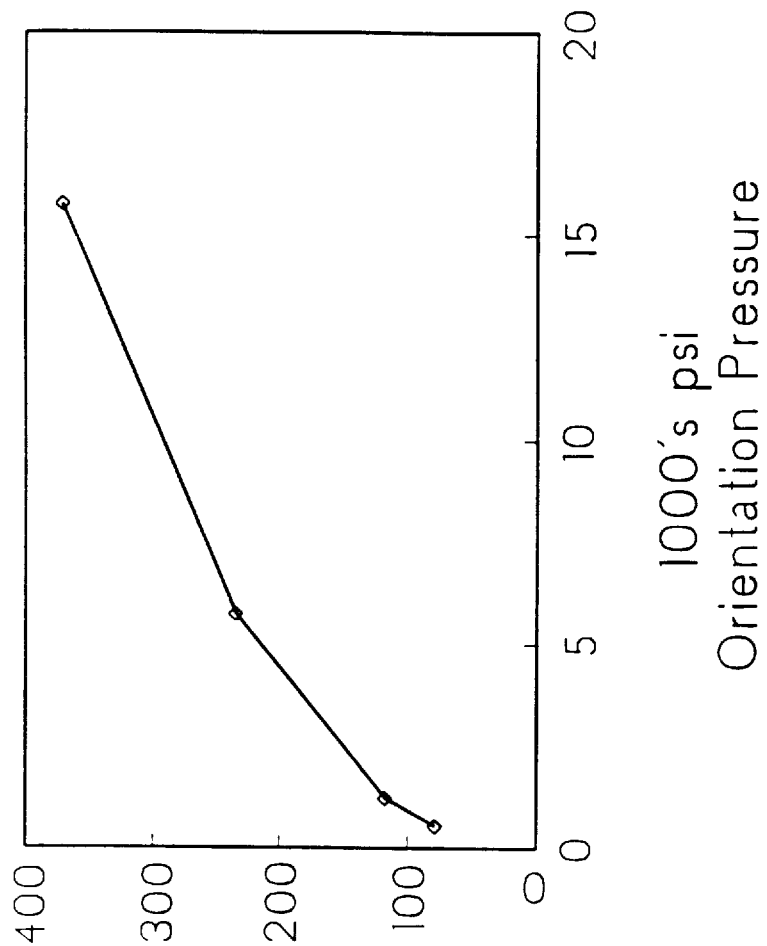
FIG. 1 is a graph showing the relationship between thermal conductivity and applied pressure upon the composite material of the present invention.
Figure 3:
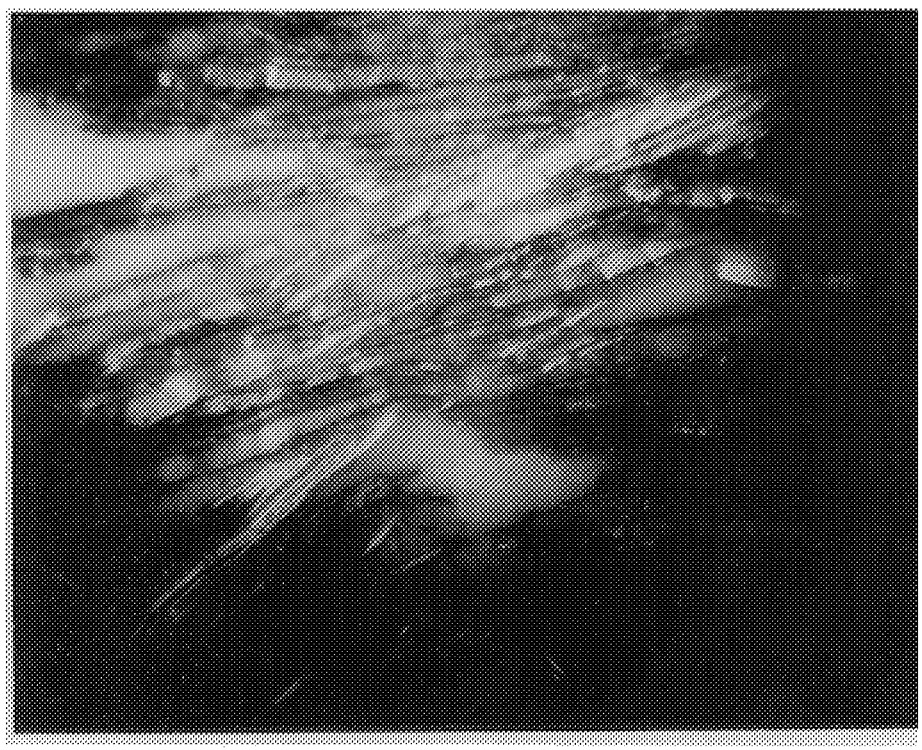
FIG. 3 is a photomicrograph at 25× magnification of a test composite of the present invention having a particle loading of 60% and a thermal conductivity of 114 W/m°K at an applied pressure of 1400 psi.
Figure 4:
FIG. 4 is another photomicrograph at 25× magnification of a test composite similar to FIG. 3 with an identical particle loading and a thermal conductivity of 380 W/m°K at an applied pressure of 16000 psi.

It was discovered in accordance with the present invention that the heat conduction through a composite of high thermal conductivity particles preferably of graphite, when loaded into a matrix of a low thermally conductive polymer resin may be substantially increased by applying a uniformly orienting force normal to the composite surface and maintaining the graphite particles under load as the polymer cures into a solid. FIG. 1 is a graph showing the relationship between thermal conductivity and applied pressure as applied normal to the composite surface. The applied pressure causes the graphite particles to align themselves parallel to each other and transverse to the direction of compression. The particles are compressed into an overlapping arrangement as pictorially shown in FIGS. 2a to 2c with the thermal conductivity of the compressed composite directly related to the magnitude of applied pressure and graphite particle loading. This is readily apparent from the photomicrographs of FIGS. 3 and 4 showing a cross section of two composite samples (equivalent to the samples in Table 1) of identical highly oriented graphite flake and polymer binder composition at an identical particle loading of 60% but which are polymerized under different applied pressures. Each of the photomicrographs shows the edges of the samples at a 25× magnification. The composite of FIG. 3 was formed at an applied pressure of 1400 psi and had a thermal conductivity of 114 W/m°K whereas the composite of FIG. 4 was formed at an applied pressure of 16000 psi and had a thermal conductivity of 380 W/m°K. Particle loading must be greater than about 40% to cause an effective increase in thermal conductivity dependent upon the pressure applied. At low particle loadings e.g. ≦40% the factor k is independent of orienting pressure whereas at a higher loading, i.e ≧40% factor k is a function of applied pressure. FIG. 1 is based upon the data in the following Table 1 derived from a composite sample of highly oriented graphite flake particles loaded into a thermoset epoxy resin system with a volume fraction of 60%:

TABLE 1

| Orienting Pressure (psi) | Thermal Conductivity (W/m °K.) |
|---|---|
| 500 | 78 |
| 1,400 | 114 |
| 5,700 | 243 |
| 16,000 | 380 |

An additional sample of composite was prepared using natural graphite flake at a 16,000 psi orienting pressure demonstrating a thermal conductivity of 250 W/mK. The degradation in thermal conductivity using natural graphite as opposed to HPOG or TPG graphite material is likely due to the high ash content of the natural graphite flake used (approximately 12% by weight). The ash, in addition, to being a poor thermal conductor, also impedes particle alignment, particle contact and percolation. From the above data it is obvious that increased orienting pressure would also give an increased thermal conductivity.

The thermal conductivity of the composite sample was measured parallel to the face of the composite using a conventional laser flash thermal diffusivity test. In accordance with this test the face of a test sample is subjected to a short laser burst and the temperature of the rear face of the sample is recorded. This test sample must be specially prepared to measure the surface thermal conductivity of the bulk composite plates since laser flash measures only through the thickness of the test sample which is perpendicular to the surface direction of concern in the composite. Composite plates were made at various orienting pressures, typically 4 mm thick. The plates were cut into 4 mm wide strips, each strip rotated 90°, then laminated together to reform a test sample having particle orientation in the test sample in the appropriate direction for the laser flash thermal diffusivity test method. From this measurement and based upon specific heat and upon sample density which is determined from geometry and mass, the thermal conductivity is then calculated.

For any given applied orienting pressure the higher the particle loading the higher the thermal conductivity up to the point where the composite loses structural integrity. The volume fraction of graphite particles in the composite may extend from 40% to 95% whereas the preferred volume fraction for the graphite particles should be between 55% and 85%. Heat conduction through the composite is a function of percolation. Percolation is the ability of the heat to traverse through the particles in the composite rather than through the polymer matrix. The degree of percolation is controlled by the applied pressure and particle loading and is independent of the composition of the polymer matrix. In fact any polymer composition may be used which will maintain the graphite particles under compression in the polymerized state, preferably a thermosetting polymer such as an epoxy resin. A thermosetting resin is preferred since it will cure under the application of pressure into a solid and remain in the cured state upon release of the applied pressure so as to maintain the graphite particles under compression. This may also be done with a thermoplastic material provided any further working or molding of the thermoplastic material be conducted under load and preferably in a vacuum. The thermal conductivity of the solid composite is established by the pressure applied before it solidifies.

The composite of highly oriented graphite flakes formed from either HPOG, TPG or natural graphite flakes have a mass density in the range of between 1.6 and 2 g/cm$^3$ which is much less than the density of copper (8.9 g/cm$^3$) and aluminum (2.7 g/cm³). Therefor the ratio of thermal conductivity to mass density for a composite formed in accordance with the present invention is much higher than for Cu or Al.

What we claim is:

1. A method of forming a machinable composite of high thermal conductivity comprising the steps of combining particles of highly oriented graphite flakes having an hexagonal crystal orientation and an aspect ratio of at least 5 to 1 with a thermosetting or thermoplastic polymeric binder to form a composition having at least a 40% graphite particle volume fraction and molding the composition in a compression molding die at elevated pressure in a direction normal to the composition surface to substantially align the particles parallel to one another and normal to the direction of the applied pressure until said binder cures into a solid so that said particles are locked in alignment following solidification thereby forming an electrically conductive solid having a high thermal conductivity greater than 100 watts/meter-k.

2. A method as defined in claim 1 wherein said highly oriented graphite comprises thermally treated graphite and natural graphite.

3. A method as defined in claim 2 wherein said composition is formed having at least a 60% graphite particle volume fraction.

4. A method as defined in claim 3 wherein said applied pressure is above at least 10,000 psi.

5. A method as defined in claim 1 wherein said polymeric binder is a thermosetting resin.

* * * * *